United States Patent
Isaac

(10) Patent No.: US 12,221,206 B2
(45) Date of Patent: Feb. 11, 2025

(54) LANDING GEAR WITH CASTER AND VARIABLE SHIMMY DAMPING

(71) Applicant: Bell Textron Inc., Fort Worth, TX (US)

(72) Inventor: Mark Loring Isaac, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 77 days.

(21) Appl. No.: 18/342,123

(22) Filed: Jun. 27, 2023

(65) Prior Publication Data
US 2025/0002142 A1 Jan. 2, 2025

(51) Int. Cl.
*B64C 25/34* (2006.01)
*B64C 25/50* (2006.01)

(52) U.S. Cl.
CPC ............ *B64C 25/505* (2013.01); *B64C 25/34* (2013.01)

(58) Field of Classification Search
CPC ......... B64C 25/34; B64C 25/36; B64C 25/50; B64C 25/505; B64C 2025/345; F16F 15/02; F16F 15/043; F16F 15/10; F16F 15/12; F16F 2230/0064
USPC ........................................................ 244/50
See application file for complete search history.

(56) References Cited

U.S. PATENT DOCUMENTS

| | | | |
|---|---|---|---|
| 1,896,234 A | 2/1933 | Hathorn | |
| 2,338,572 A | 1/1944 | Corwin | |
| 2,508,351 A | 5/1950 | Bjerke | |
| 2,522,032 A | 9/1950 | Gerry | |
| 2,572,589 A | 10/1951 | Bishop | |
| 2,656,995 A | 10/1953 | Wolf | |
| 5,333,816 A | 8/1994 | Del Monte | |
| 7,284,764 B2 * | 10/2007 | Prohaska | B60G 11/27 280/124.157 |
| 9,346,539 B2 * | 5/2016 | Young | B64C 25/50 |
| 10,457,386 B2 | 10/2019 | Luce et al. | |
| 11,433,994 B2 * | 9/2022 | Nowakowski | B64C 25/04 |
| 2006/0278755 A1 * | 12/2006 | Bachmeyer | B64C 25/505 244/50 |
| 2012/0018573 A1 * | 1/2012 | Jones | B64C 25/505 244/50 |
| 2016/0052623 A1 * | 2/2016 | Elliott | B64C 25/18 244/102 R |
| 2021/0381573 A1 | 12/2021 | Christenson | |

* cited by examiner

*Primary Examiner* — Joshua E Rodden
(74) *Attorney, Agent, or Firm* — Fogarty LLP

(57) ABSTRACT

An aircraft landing gear shimmy damping device for aircraft landing gear with castering may include a centering cam engaged in a curvic slot in an internal diameter of an aircraft landing gear wheel spindle when the landing gear wheel is aligned with forward ground travel of the aircraft, engaging a landing gear wheel shimmy dampener. The centering cam may be pushed out of the curvic slot when the aircraft begins to turn, disengaging the landing gear wheel shimmy dampener, and may slide back into the curvic slot and (re)engage the shimmy dampener, when the landing gear wheel is realigned with forward ground travel of the aircraft.

20 Claims, 12 Drawing Sheets

LANDING GEAR WITH CASTER AND VARIABLE SHIMMY DAMPING

STATEMENT REGARDING FEDERALLY SPONSORED RESEARCH OR DEVELOPMENT

This invention was made with government support under W911W6-19-9-0002 awarded by the Department of Defense (US Army). The government has certain rights in the invention.

TECHNICAL FIELD

The present disclosure relates generally to aircraft, more specifically to aircraft landing gear, and particularly to landing gear with (360-degree) caster and variable shimmy damping.

BACKGROUND

For aircraft, "auxiliary landing gear" refer to a nose gear, a tail gear, outrigger-type gear, or the like, whereas the "main" landing gear are the (two or more) (larger) landing gear normally located close to the aircraft's center of gravity. Such auxiliary landing gear may "caster" (castor), that is, pivot about a substantially vertical axis. Auxiliary landing gear (such as many nose gear) may be steerable, such as through use of aircraft rudder pedals. However, some auxiliary landing gear may be "free castering," that is, the auxiliary landing gear swivels with no mechanism incorporated with which to physically steer the wheel. In aircraft with free castering auxiliary landing gear, steering can be effected aerodynamically by using rudder input, by utilizing differential braking or, in multi engine aircraft, with use of differential thrust.

"Shimmy" is an unwanted vibration of the landing gear. At certain cyclical loadings that arise under various conditions of wheel speed and terrain, the suspension becomes unstable and the suspension system develops a self-sustaining oscillation commonly referred to a shimmy. Auxiliary landing gear, particularly (free) castering auxiliary landing gear are susceptible to shimmy. If left unchecked, landing gear shimmy can be extremely problematic to the aircraft. This is because shimmy oscillations can, not cause cabin vibrations, but can reduce the stability of the gear, and may adversely impact the controllability of the aircraft, may, over time, cause additional fatigue to the landing gear structure, and may, ultimately, cause the gear to fail (collapse), which may be catastrophic, especially during landing and take-off.

Addition of a shimmy damping device complicates (360-degree) caster when caster is required for ground handling, especially when a centering mechanism is applied. Application of a viscous style of damper can provide shimmy damping, but is limited by having single unalterable spring rate. While such a viscous style of damper with an annular elastomeric can be applied to provide landing gear shimmy damping, tuning of these annular elastomers can be challenging and expensive. Thus, it is challenging to provide for shimmy damping with variable spring rates for auxiliary landing gear that is designed for 360-degree caster. Additionally, a spring loaded centering cam typical in such "castering" auxiliary landing gear makes it further challenging to apply a shimmy damper with variable spring rates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to devices, systems and methods which provide aircraft auxiliary landing gear with (360-degree) caster and variable shimmy damping. In accordance therewith, an aircraft landing gear shimmy damping device for aircraft landing gear with castering may include a centering cam engaged in a curvic slot in an internal diameter of an aircraft landing gear wheel spindle when the landing gear wheel is aligned with forward ground travel of the aircraft, engaging a landing gear wheel shimmy dampener. The centering cam may be pushed out of the curvic slot when the aircraft begins to turn, disengaging the landing gear wheel shimmy dampener, and may slide back into the curvic slot and (re)engage the shimmy dampener, when the landing gear wheel is realigned with forward ground travel of the aircraft.

For example, for an aircraft having a landing gear mounting arm, such as a landing gear tailing arm extending from the aircraft's fuselage, a landing gear wheel spindle, which may include a landing gear yoke, may rotationally mount at least one landing gear wheel. The landing gear wheel spindle may have a hollow pivot shaft to be rotationally mounted to the landing gear mounting arm. For providing (360-degree) caster and variable shimmy damping, the hollow pivot shaft defines a reduced diameter bore portion, a further reduced diameter bore portion within the reduced diameter bore, and a curvic slot defined in an inner surface of the further reduced diameter bore portion, extending across the further reduced diameter bore portion, open to the reduced diameter bore portion. A damper shaft may be rotatably retained in the hollow pivot shaft, with the damper shaft engaging a torsional damper, torsionally anchored to the landing gear mounting arm. A centering slider, with an integral centering cam extending from the centering slider may be retained longitudinally displaceable about the damper shaft in the hollow pivot shaft. An upper spring may be disposed above the centering slider in spring engagement with the centering slider and the landing gear wheel spindle, and a lower spring may be disposed below the centering slider in spring engagement with the centering slider and the landing gear wheel spindle. The upper and lower spring may bias the centering slider into engagement of the centering cam into the curvic slot when the at least one landing gear wheel is generally aligned longitudinally with the fuselage for forward travel of the aircraft, engaging the torsional damper with the at least one landing gear wheel, and biasing the centering slider along the curvic slot and the centering cam out of the curvic slot into the reduced diameter bore portion, disengaging the centering slider from the damper shaft and allowing the landing gear wheel spindle and mounted at least one landing gear wheel to rotate disengaged with the torsional damper, as the at least one landing gear wheel moves out of longitudinally alignment with the fuselage.

Thusly, in operation, an aircraft landing gear shimmy damper may be engaged, by engaging a centering cam of a damper shaft in a curvic slot in an internal diameter of a landing gear wheel spindle when the landing gear wheel is aligned with forward ground travel of the aircraft. The centering cam may be pushed out of the curvic slot when the aircraft begins to turn, disengaging the aircraft landing gear shimmy dampener, and the centering cam may slide back into the curvic slot, when the aircraft returns to a straight-line travel, reengaging the aircraft landing gear shimmy dampener.

Additionally, varying aircraft landing gear shimmy damping may be carried out by exchanging the aircraft landing gear shimmy damper, such as by disengaging the aircraft landing gear shimmy damper from the damper shaft and engaging a different aircraft landing gear shimmy damper with the damper shaft.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
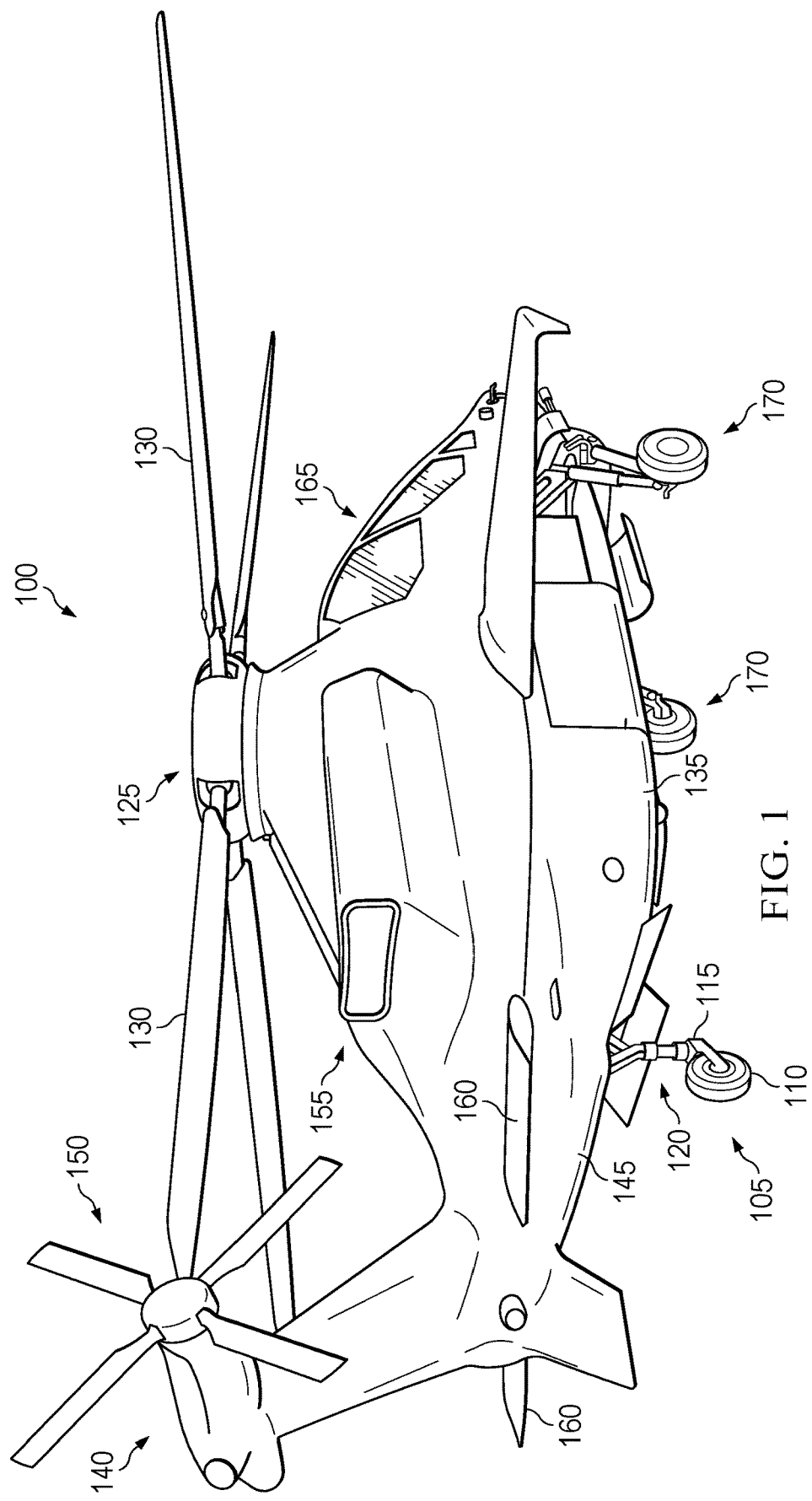
Figure 2:
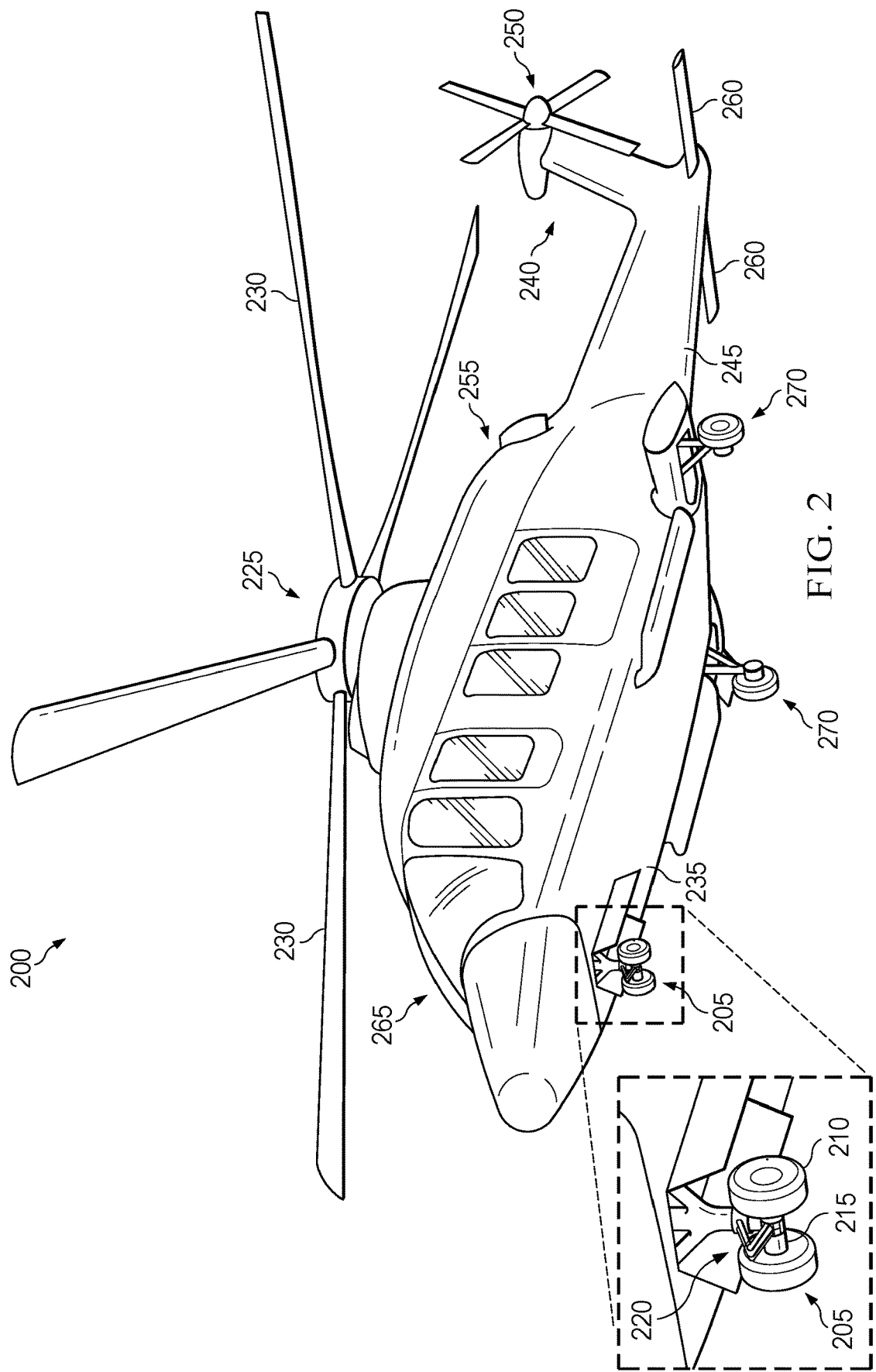
Figure 3A:
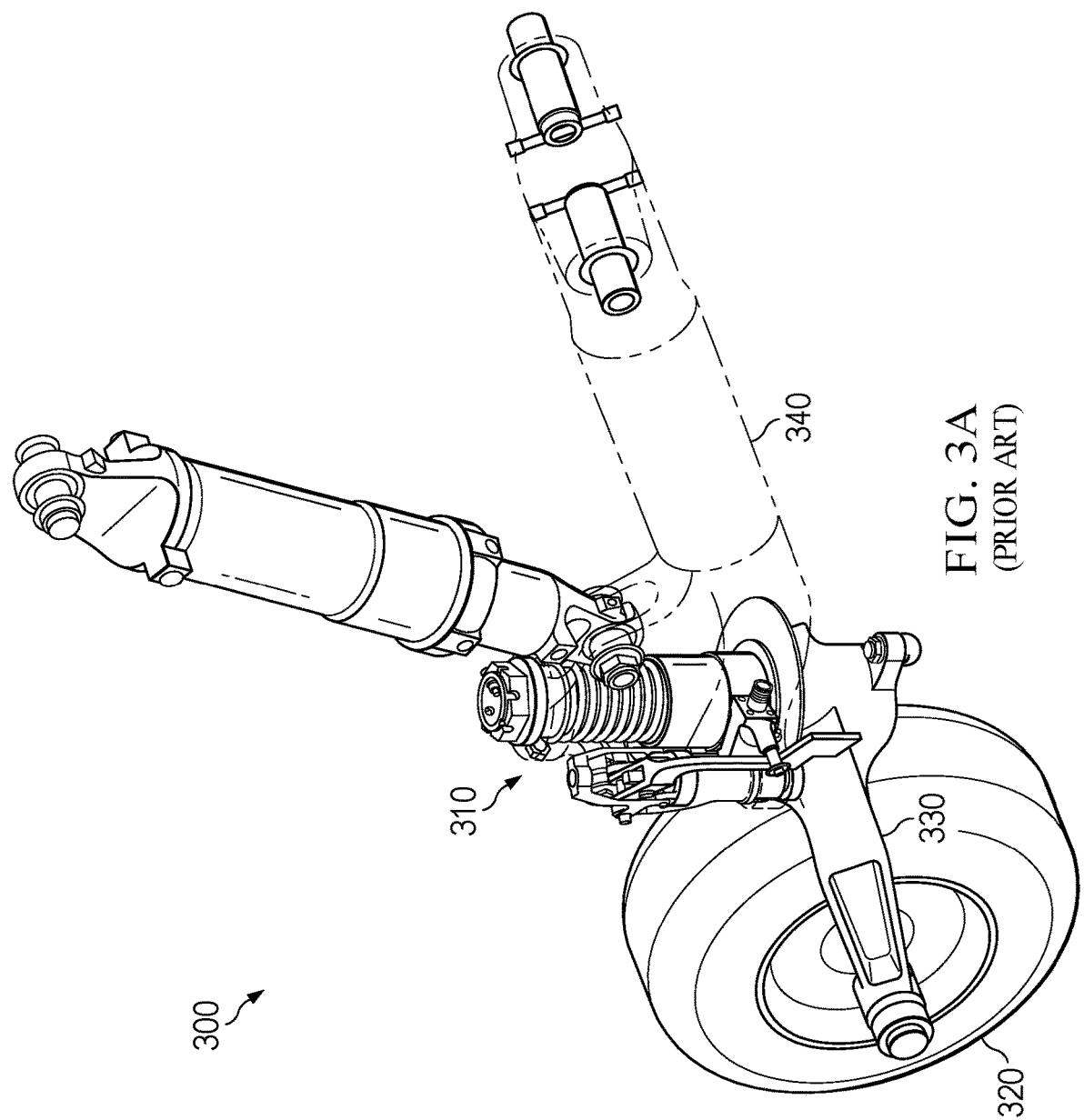
Figure 3B:
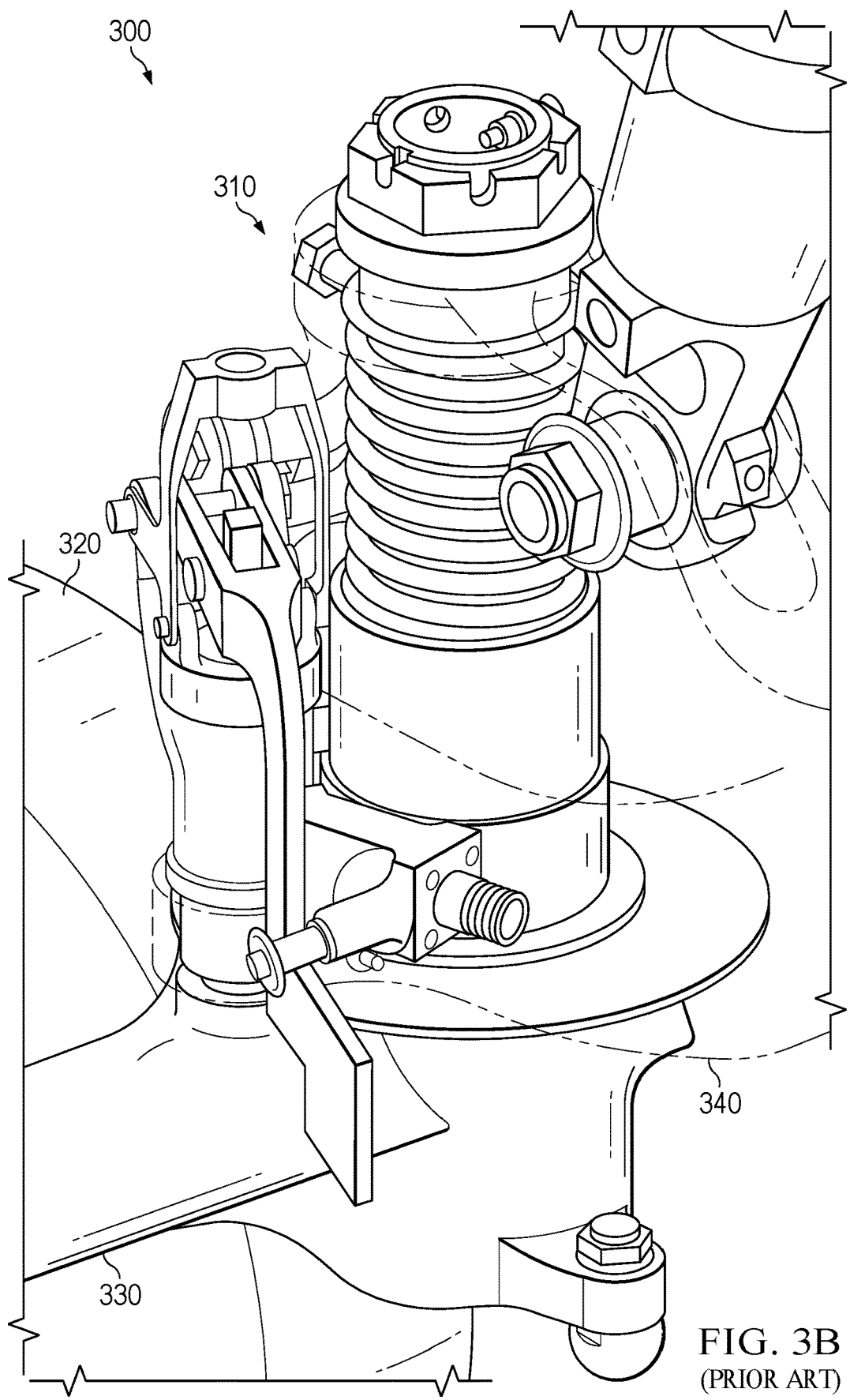
Figure 4A:
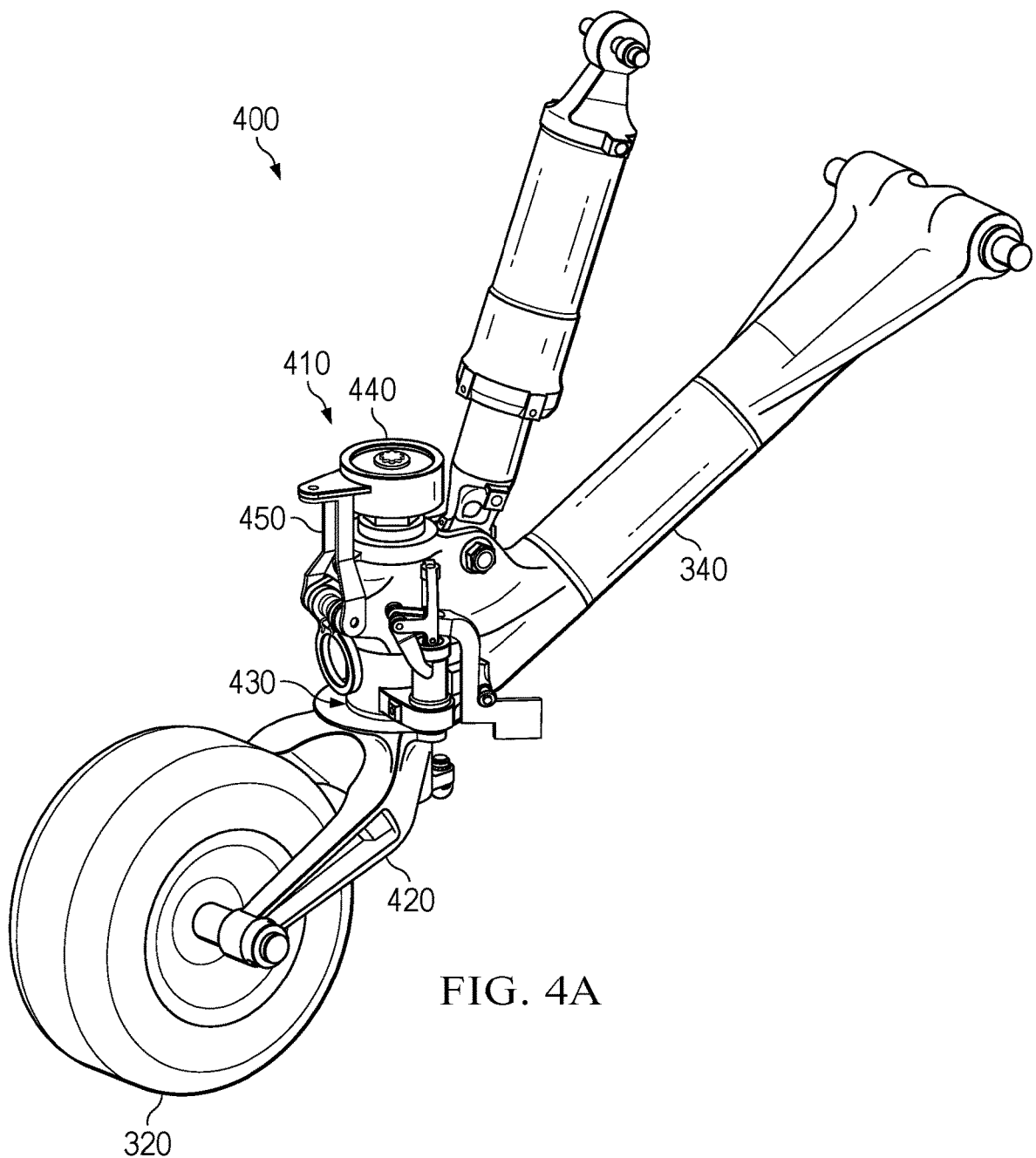
Figure 4B:
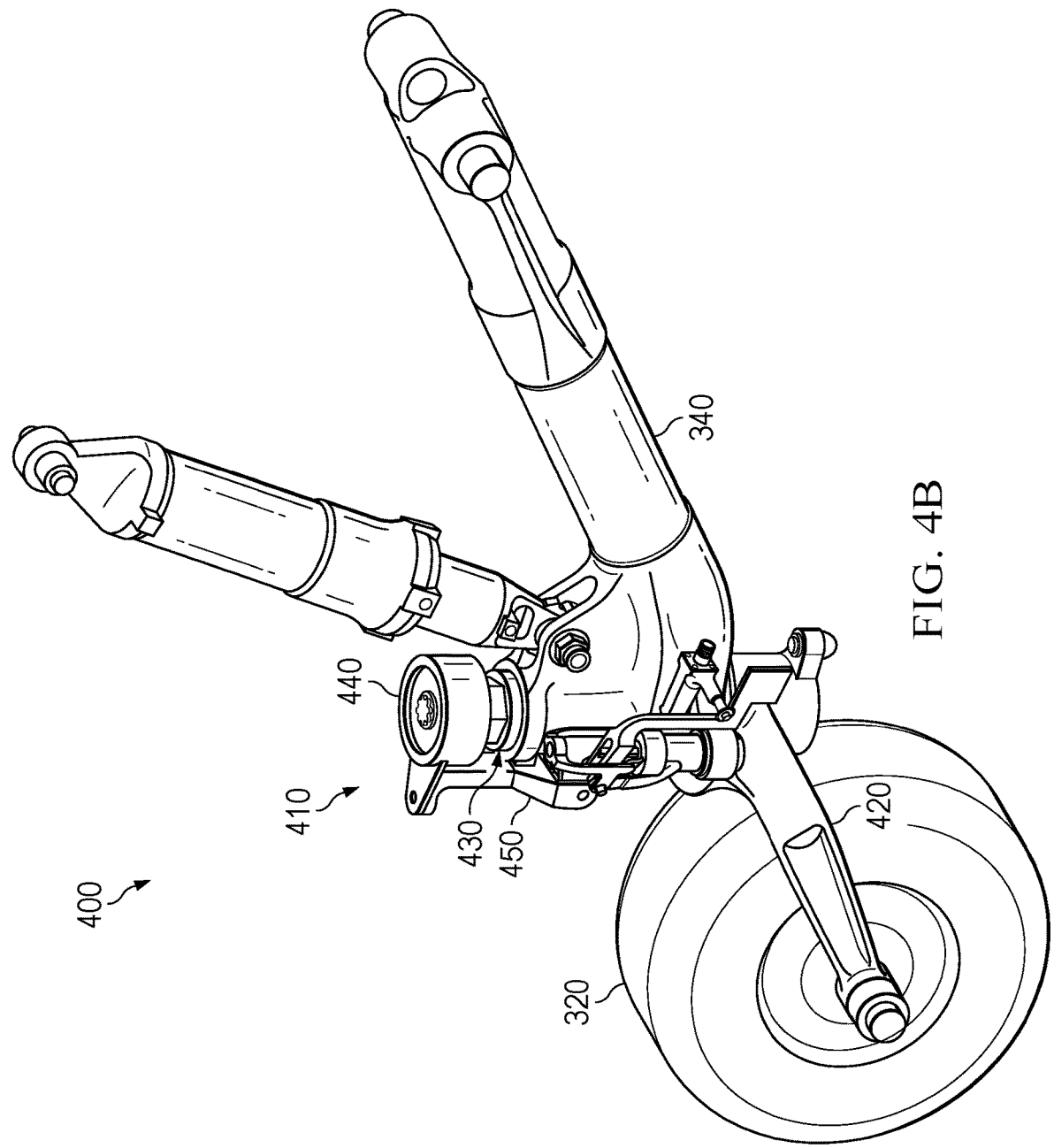
Figure 4C:
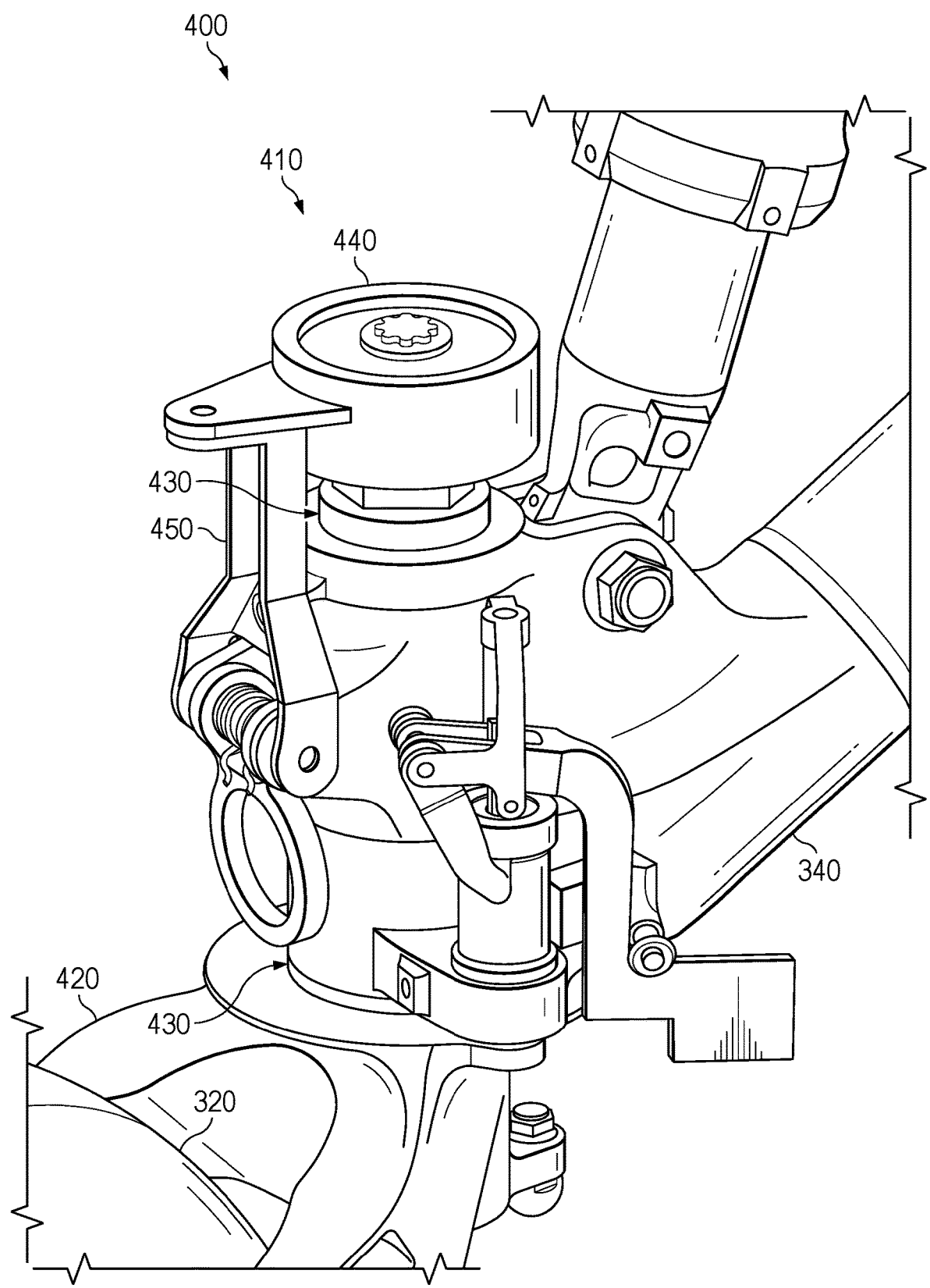
Figure 5:
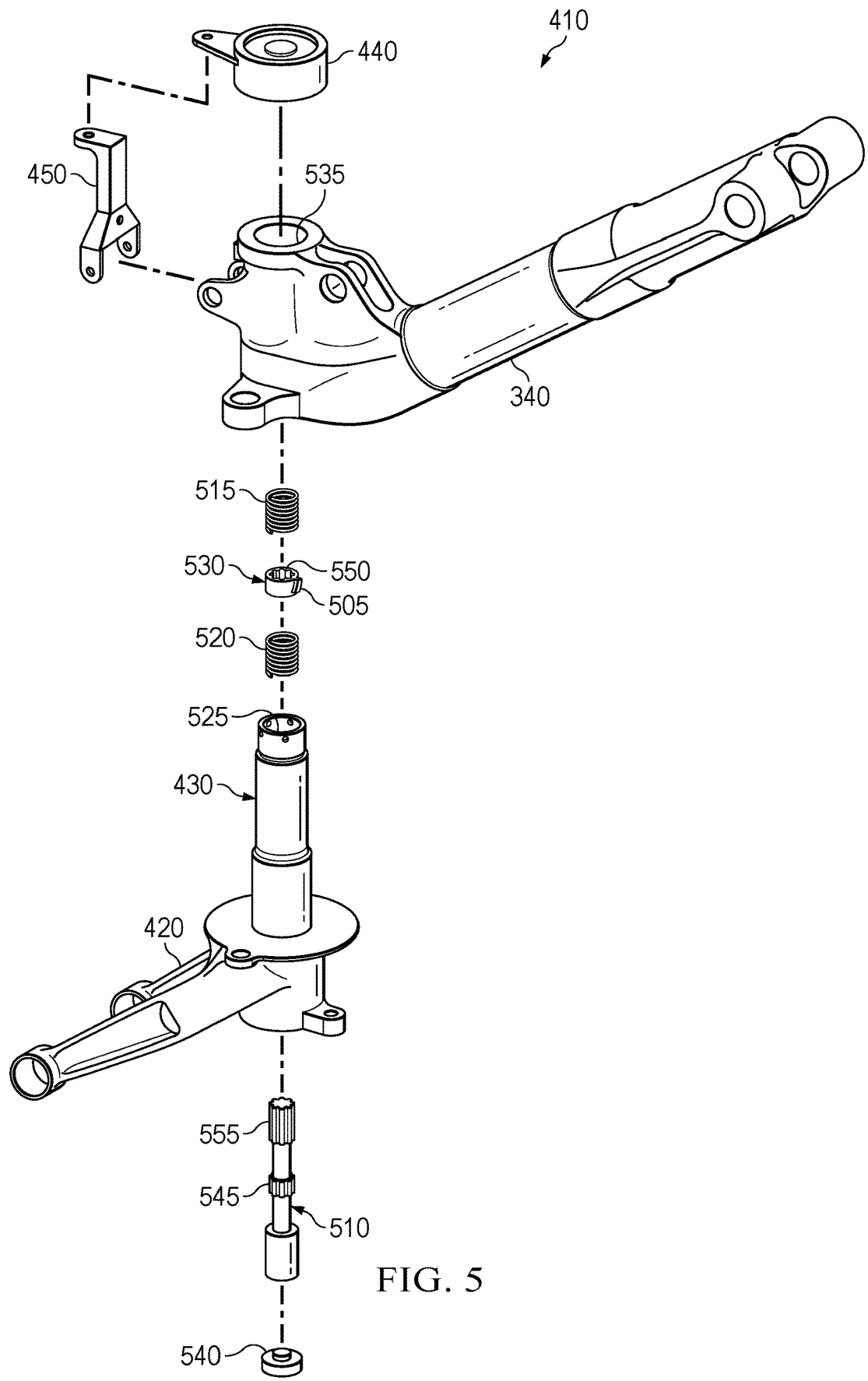
Figure 6:
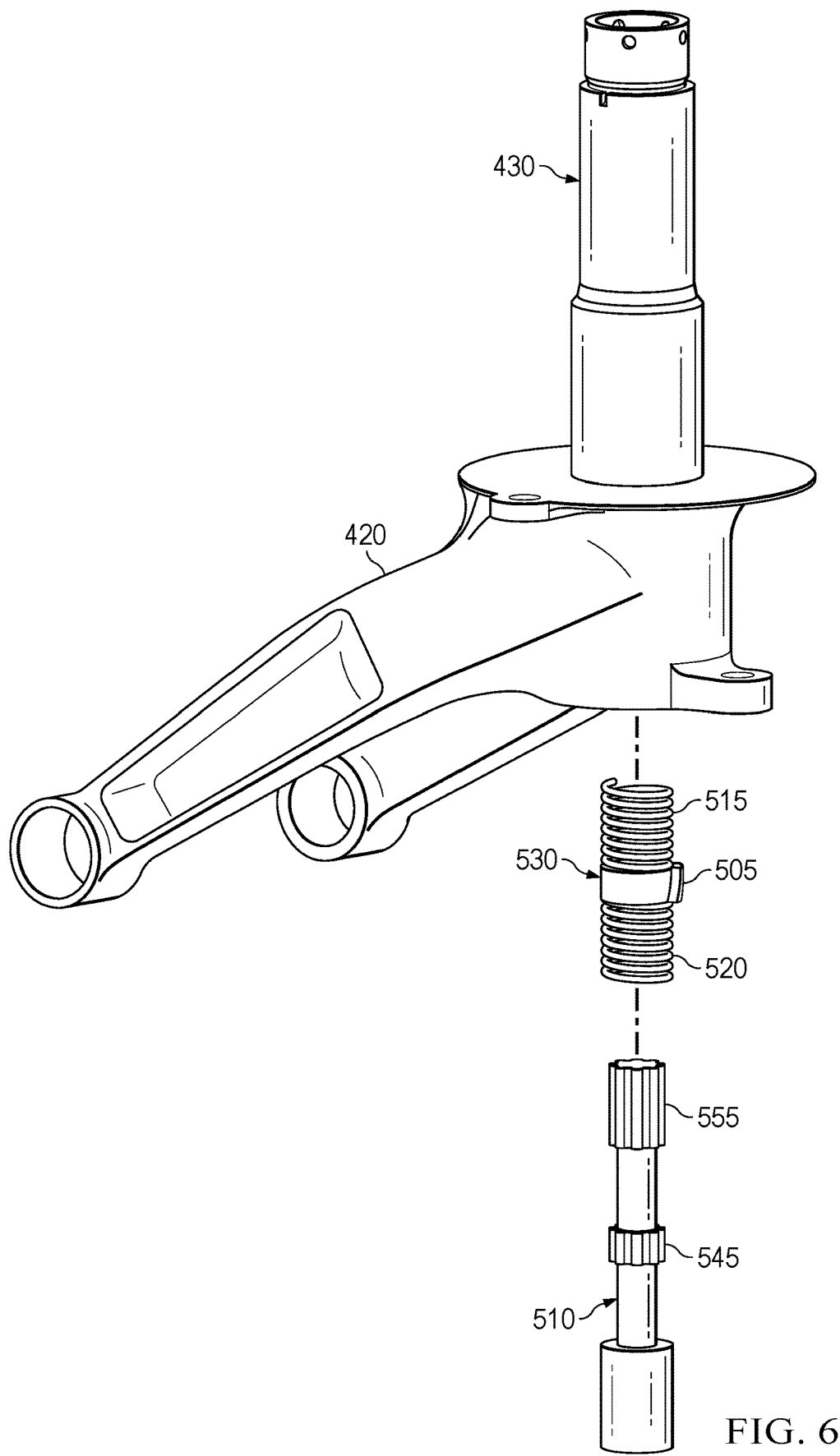
Figure 7A:
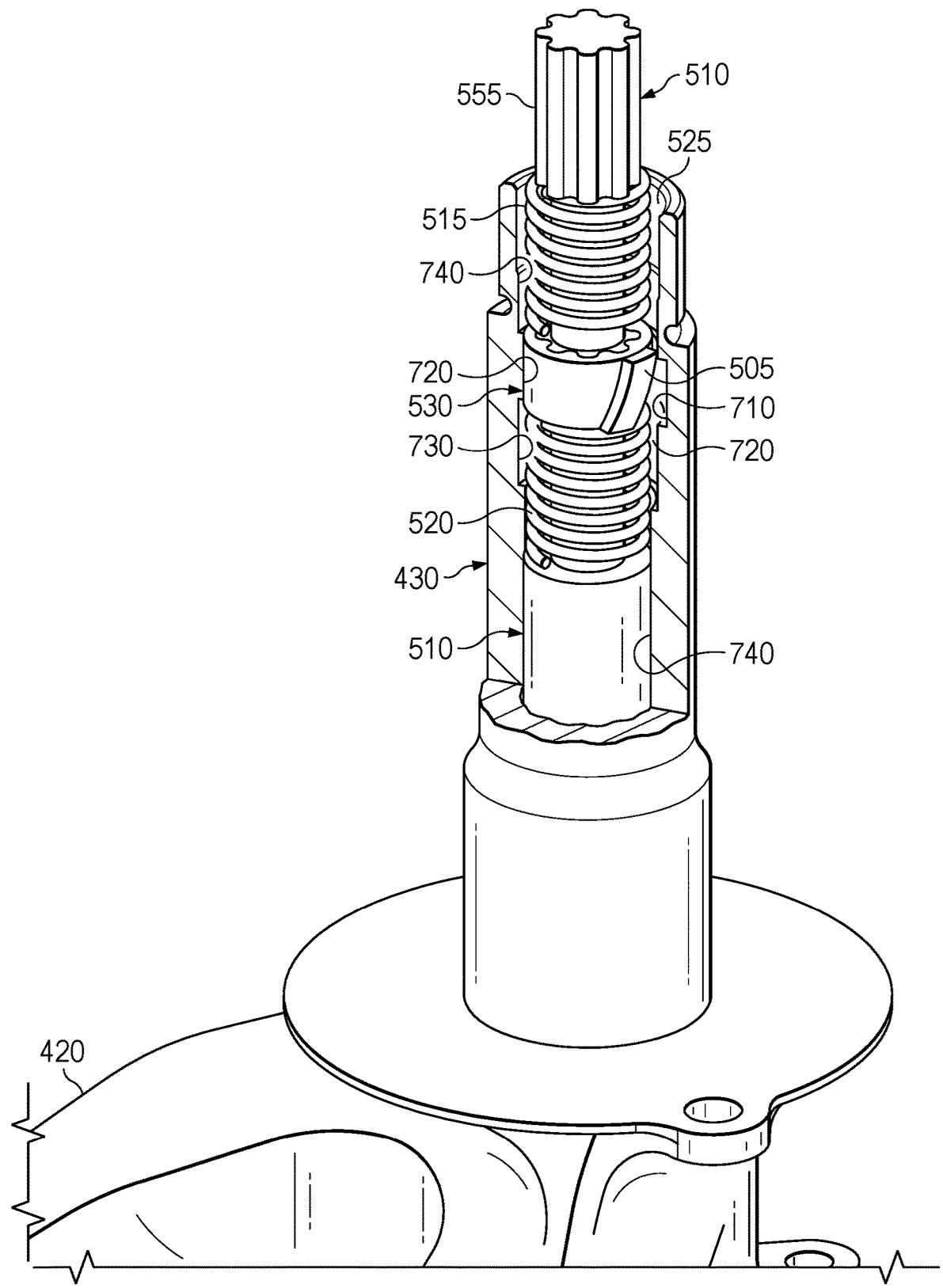
Figure 7B:
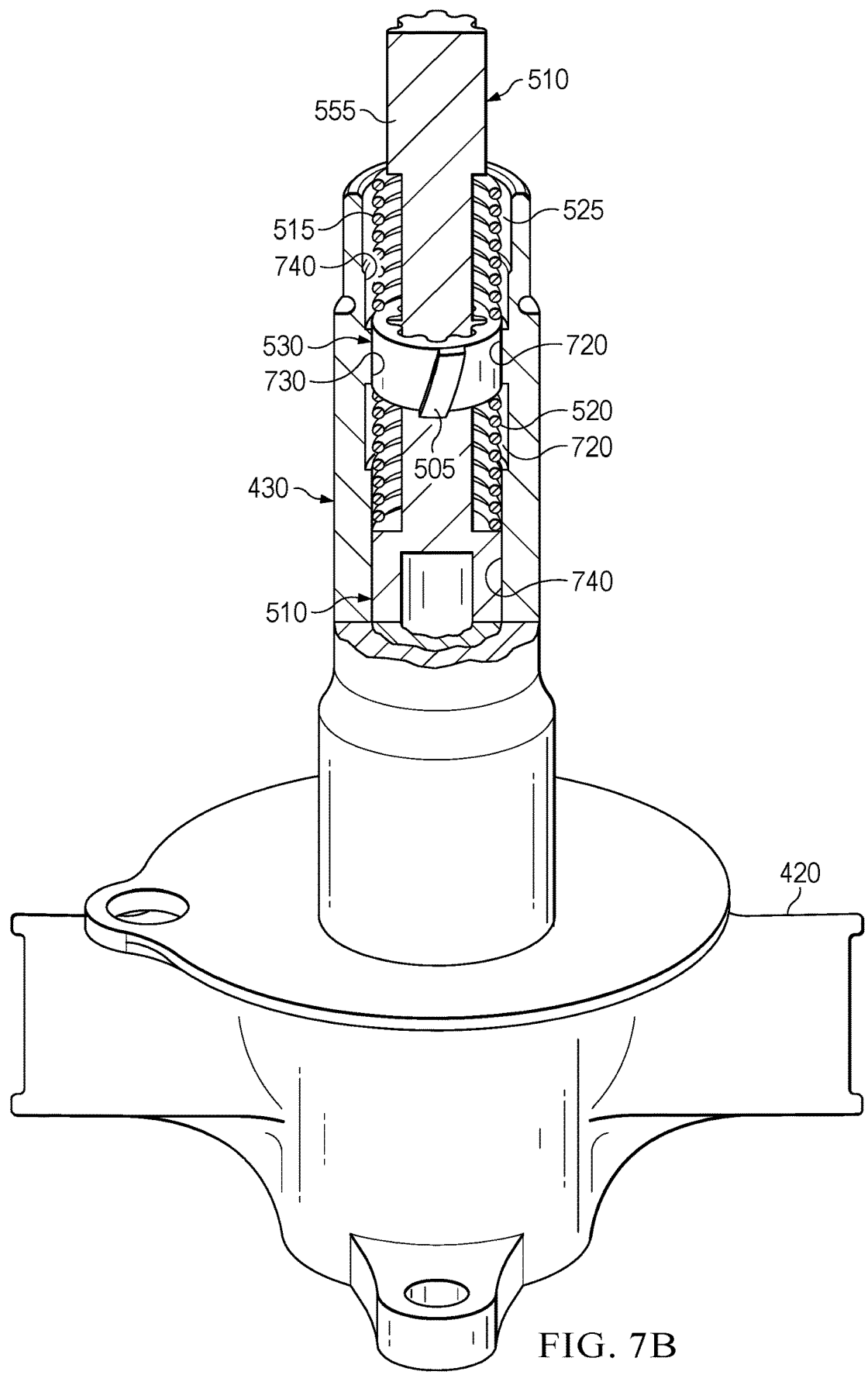
Figure 8:
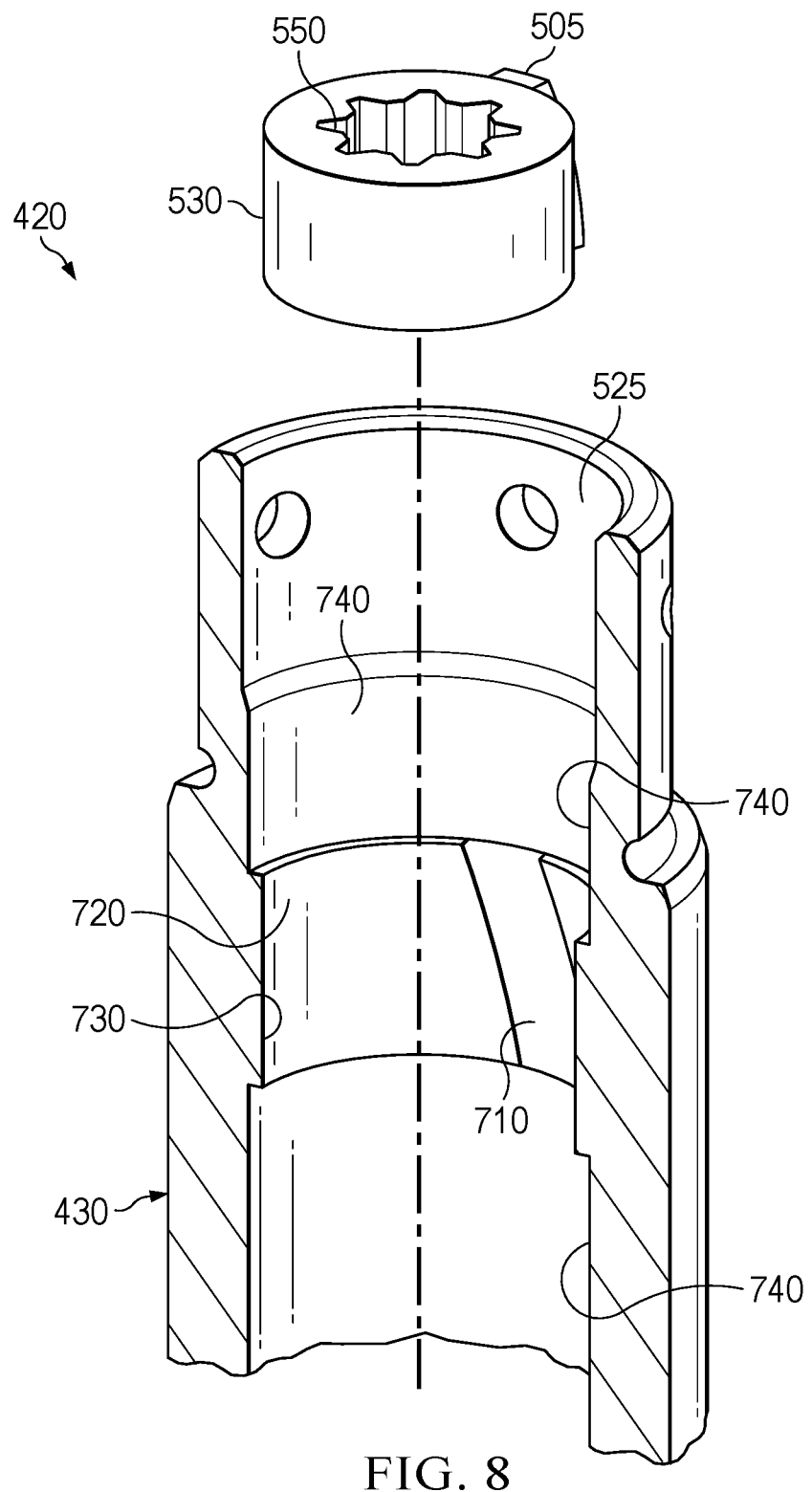

Having thus described the invention in general terms, reference will now be made to the accompanying drawings, which are not necessarily drawn to scale, and which are incorporated in and form part of the specification and in which like numerals designate like parts, illustrate embodiments of the present invention and together with the description, serve to explain the principles of the invention. In the drawings:

FIG. 1 is a diagrammatic perspective illustration of an aircraft with an auxiliary landing gear tail wheel;

FIG. 2 is a diagrammatic perspective illustration of an aircraft with an auxiliary landing gear nose wheel;

FIG. 3A is a diagrammatic, partially fragmented, perspective illustration of a typical auxiliary landing gear with shimmy dampening;

FIG. 3B is an enlarged, partially fragmented, perspective view of the diagrammatic illustration of the typical auxiliary landing gear 360 degree caster and shimmy dampener in FIG. 3A;

FIGS. 4A and B are diagrammatic perspective illustrations of an auxiliary landing gear with 360-degree caster and variable shimmy dampening, according to some embodiments;

FIG. 4C is an enlarged perspective view of the diagrammatic illustration of the auxiliary landing gear with 360-degree caster and variable shimmy dampening of FIGS. 4A and B, according to some embodiments;

FIG. 5 is an exploded diagrammatic perspective illustration of the auxiliary landing gear with 360-degree caster with variable shimmy dampening, according to some embodiments;

FIG. 6 is an exploded diagrammatic perspective illustration of a landing gear caster yoke (including its hollow yoke pivot shaft), an upper centering cam spring, a centering cam, a lower centering cam spring and a damper shaft of the auxiliary landing gear with 360-degree caster and variable shimmy dampening, according to some embodiments;

FIG. 7A is a partially fragmented diagrammatic perspective illustration of a portion of the auxiliary landing gear with 360-degree caster and variable shimmy dampening, according to some embodiments;

FIG. 7B is a partially fragmented diagrammatic (front) view of a portion of the auxiliary landing gear with 360-degree caster and variable shimmy dampening, according to some embodiments; and FIG. 8 is a partially fragmented, generally cross-sectional, diagrammatic (rear perspective) exploded view of a portion of the landing gear caster hollow yoke pivot shaft, with the centering cam, of the auxiliary landing gear with 360-degree caster and variable shimmy dampening, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, although embodiments of the present devices, systems and methods may be described below with reference to rotary wing and/or tiltrotor aircraft, embodiments of the present devices, systems and methods may be applicable to various types of aircraft, including not only rotary wing and tiltrotor aircraft, but also fixed wing aircraft, etc.

Embodiments of the present devices, systems and methods relate generally to aircraft and more specifically to aircraft landing gear. As noted above, addition of a shimmy damping device to aircraft (auxiliary) landing gear typically complicates (360-degree) caster when caster is desired for ground handling, especially when a centering mechanism is applied to the landing gear caster. Embodiments of the present devices, systems and methods enables both 360-degree caster and variable spring rate shimmy damping. In particular, embodiments of the present devices, systems and methods add a mechanism above a top of a landing gear caster yoke that incorporates a shimmy damper and a release mechanism internal to the yoke pivot shaft, both shimmy dampening and 360-degree caster are thereby enabled, while providing great flexibility in spring rates. Therefore, embodiments of the present devices, systems and methods may employ a centering cam engaged in a curvic slot in an internal diameter of an aircraft landing gear wheel spindle when the landing gear wheel is aligned with forward ground travel of the aircraft, engaging a landing gear wheel shimmy dampener. The centering cam may be pushed out of the curvic slot when the aircraft begins to turn, disengaging the landing gear wheel shimmy dampener, and may slide back into the curvic slot and (re)engage the shimmy dampener, when the landing gear wheel is realigned with forward ground travel of the aircraft.

FIG. 1 is a diagrammatic perspective illustration of aircraft 100 with auxiliary landing gear 105, that includes tail wheel 110 mounted on yoke 115 for 360-degree caster and variable shimmy dampening system 120, according to some embodiments. FIG. 2 is a diagrammatic perspective illustration of aircraft 200 with auxiliary landing gear 205 that includes nose wheel 210 mounted on yoke 215 for (360-degree) caster and variable shimmy dampening system 220, according to some embodiments. Referring to both FIGS. 1 and 2, rotorcraft 100 and 200 are schematically illustrated. Rotorcraft 100 and 200 each have a main rotor system 125 or 225 with a plurality of rotor blades 155 or 255. The pitch of rotor blades 155 and 255 can be collectively and cyclically manipulated to selectively control direction, thrust, and lift of rotorcraft 100 or 200. Each of rotorcraft 100 and 200 and includes a fuselage 160 or 260, an anti-torque system 170 or 270, and an empennage 180 or 280. Anti-torque system 170 or 270 may include a tail rotor 195 or 295, no-tail-rotor (NOTAR), or dual main rotor system. In rotorcraft with tail rotor 195 or 295, the pitch of each tail rotor blade is collectively changed in order to vary thrust of the anti-torque system, providing directional control of rotorcraft 100 or 200. The pitch of the tail rotor blades is changed by one or more tail rotor actuators. In some embodiments, a fly-by-wire (FBW) system sends electrical signals to the main rotor actuators or tail rotor actuators to control flight of rotorcraft 100 or 200.

Power is supplied to main rotor system 125 or 225 and anti-torque system 140 or 240 by one or more engines 155 or 255. Engines 155 or 255 may be controlled according to signals from the FBW system. The output of engine 155 or 255 is provided to a driveshaft that is mechanically and operatively coupled to main rotor system 125 or 225 and anti-torque system 140 or 240 through a main rotor transmission and a tail rotor transmission, respectively.

Empennage 145 or 245 may have other flight control devices such as horizontal or vertical stabilizers, rudder, elevators, or other control or stabilizing surfaces that are used to control or stabilize flight of rotorcraft 100 or 200. The fuselage 135 or 235 includes cockpit 165 or 265, which includes displays, controls, and instruments. In some embodiments, cockpit 165 or 265 is configured to accommodate a pilot or a pilot and co-pilot. It is also contemplated, however, that rotorcraft 100 or 200 may be operated remotely, in which case cockpit 165 or 265 could be configured as a fully functioning cockpit to accommodate a pilot (and possibly a co-pilot as well) to provide for greater flexibility of use or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 100 or 200 could be configured as an unmanned vehicle, in which case cockpit 165 or 265 could be eliminated entirely in order to save space and cost.

As noted, embodiments of the present devices, systems and methods are directed to variable shimmy dampening mechanism 120 or 220, such as for auxiliary landing gear 105 or 205, mounted for 360-degree caster. However, aircraft 100 or 200 may also include main landing gear 170 or 270, generally fixed, aligned with a central axis of the aircraft, and which may be located close to the aircraft's center of gravity.

FIG. 3A is a diagrammatic, partially fragmented, perspective illustration of typical auxiliary landing gear 300 with shimmy dampening 310 and FIG. 3B is an enlarged, partially fragmented, perspective view of typical auxiliary landing gear 300 having landing gear wheel 320 (e.g., 110) mounted on conventional yoke 330 for 360-degree caster and shimmy dampening 310. As noted, it is challenging to provide for shimmy damping with variable spring rates in such typical auxiliary landing gear that is designed for 360-degree caster and typical use of a spring loaded centering cam makes it further challenging to apply a shimmy damper with variable spring rates.

FIGS. 4A and B are diagrammatic perspective illustrations of auxiliary landing gear 400 (e.g., 105) with 360-degree caster and variable shimmy dampening 410 (e.g., 120), according to some embodiments and FIG. 4C is an enlarged perspective view of the diagrammatic illustration of auxiliary landing gear 400 with 360-degree caster and variable shimmy dampening 410, of FIGS. 4A and B, according to some embodiments. As noted, embodiments of the present devices, systems and methods add shimmy dampening mechanism 410 above landing gear caster yoke 420 (e.g., 115) that incorporates shimmy damper 410 with a release mechanism internal to yoke pivot shaft 430, both shimmy dampening and 360-degree caster are thereby enabled, while providing great flexibility in spring rates. Therein, a spring rate of the shimmy dampening can be changed by swapping to a different spring rate torsional damper 440, such as described below.

FIG. 5 is an exploded diagrammatic perspective illustration of a portion of auxiliary landing gear 400 with 360-degree caster, showing components of variable shimmy dampening mechanism 410 in conjunction with typical auxiliary landing gear trailing arm 340, according to some embodiments. Therein, centering cam 505 may engage a curvic slot defined (e.g., machined) in an internal diameter of an aircraft landing gear wheel spindle, which, in accordance with embodiments of the present devices, systems and methods, may include landing gear caster yoke pivot shaft 430, as described in further detail below. As used herein, the term "curvic slot" denotes a (precision-formed) slot defined in an internal diameter. This curvic slot follows the curve of that internal diameter, with a (generally) uniform depth and width, with the width and depth of the curvic slot matching a width and extent of the centering cam, for mating therewith. When landing gear wheel 320 is aligned with forward ground travel of the aircraft (e.g., 100), engaging landing gear wheel shimmy dampener 440. Centering cam 505 may be deployed in the aircraft landing gear wheel spindle (e.g., yoke pivot shaft 430), as described in greater detail below, so as to be pushed out of the curvic slot when the aircraft begins to turn, disengaging landing gear wheel shimmy dampener 440, and slide back into the curvic slot and engage the shimmy dampener, when landing gear wheel 320 is realigned with forward ground travel of the aircraft. Centering cam 505 may also, as described in further detail below, transfer turning torque through damper shaft 510 engaged with (splined) shimmy dampener 440.

Centering cam 505 may, as described in further detail below, be biased into, and back into, engagement in the curvic slot by upper spring 515 and/or lower spring 520.

Centering cam 505 may also be held against the internal diameter of the aircraft landing gear wheel spindle by upper spring 515 and/or lower spring 520. To wit, FIG. 6 is an exploded diagrammatic perspective illustration showing the relative arrangement of landing gear caster yoke hollow pivot shaft 430, upper centering cam spring 515, centering cam 505, lower centering cam spring 520 and damper shaft 510 of auxiliary landing gear 400 with 360-degree caster and variable shimmy dampening 410, according to some embodiments.

FIGS. 7A and B are a partially fragmented diagrammatic perspective illustration and a partially fragmented diagrammatic front view of a portion of auxiliary landing gear 400 with 360-degree caster and variable shimmy dampening 410, according to some embodiments. FIGS. 7A and B show upper centering cam spring 515, centering cam 505 and lower centering cam spring 520 installed on damper shaft 510, with all of which installed in landing gear caster hollow yoke pivot shaft 430, according to some embodiments. Conversely, FIG. 8 is a partially fragmented, generally cross-sectional, diagrammatic (rear perspective) exploded view of a portion of landing gear caster hollow yoke pivot shaft 430, with centering cam 505, according to some embodiments. FIGS. 7A and 8 show curvic slot 710 defined in inner surface 720 of (further) reduced diameter bore portion 730 of bore 525 of landing gear caster yoke hollow pivot shaft 430.

With reference now, variously, to each of FIGS. 4A, 4B, 4C, 5, 6, 7A, 7B and 8, aircraft (auxiliary) 360-degree castering landing gear 400 (e.g., 105) variable shimmy dampening 410 (e.g., 120) will be described, according to some embodiments. 360-degree castering auxiliary aircraft landing gear 400 includes a landing gear mounting arm extending from the fuselage (135, 235) of the aircraft (100, 200), such as landing gear tailing arm 340, pivotally mounted to the fuselage. Landing gear tailing arm 340 pivotally mounts a landing gear wheel spindle, such as (auxiliary) landing gear yoke 420, is configured to rotationally mount at least one landing gear wheel 320. (Auxiliary) landing gear yoke 420 includes (upwardly projecting) landing gear caster pivot shaft 430, which, in accordance with embodiments of the present devices, systems and methods, is hollow. Landing gear tailing arm 340 rotationally mounts yoke pivot shaft 430, and thereby yoke 420 and wheel 320. Yoke pivot shaft 430 is received by, and rotationally secured in, landing gear tailing arm bore 535.

As noted, hollow yoke pivot shaft bore 525 includes reduced diameter bore portion 740, and further reduced diameter bore portion 730 within reduced diameter bore 740. Curvic slot 710 is defined in inner surface 720 of further reduced diameter bore portion 730, extending across the further reduced diameter bore portion, open to reduced diameter bore portion 740. Damper shaft 510 is rotatably retained in bore 525 of hollow pivot shaft 430 retained by retention nut (or bolt) 540. Damper shaft 510 engages torsional damper 440, which is torsionally anchored to the landing gear tailing arm 340, such as by detachable damper mount 450. Centering slider 530 defines integral centering cam 505 extending from the centering slider. Centering slider 530 is retained longitudinally displaceable about damper shaft 510 in hollow pivot shaft bore 525. Centering slider 530 is retained longitudinally displaceable on centering slider damper shaft splines 545 and damper shaft centering slider splines 550. To wit, centering slider 530 defining integral centering cam 505 extending therefrom is retained longitudinally displaceable about damper shaft 510 in hollow pivot shaft bore 525, engaged with further reduced diameter bore portion 730, while being retained longitudinally displaceable on centering slider damper shaft splines 545, via damper shaft centering slider splines 550.

Upper spring 515 is disposed above centering slider 530 in spring engagement with the centering slider and hollow pivot shaft 430, and lower spring 520 is disposed below the centering slider in spring engagement with the centering slider and hollow pivot shaft. As illustrated, upper spring 515 and lower spring 520 may be disposed in bore 525 of hollow pivot shaft 430, in engagement with the hollow pivot shaft, with centering slider 530 disposed in spring bias between the upper spring and the lower spring. Thereby, upper and lower springs 515 and 520 bias centering cam 505 into engagement into curvic slot 710, such as when (auxiliary) landing gear wheel 320 is generally aligned longitudinally with the aircraft fuselage (135) for forward travel of the aircraft. This results in engagement of torsional damper 440 with (auxiliary) landing gear wheel 320. Upper and lower springs 515 and 520 also bias centering slider 530, and thereby, centering cam 505 along curvic slot 710 and out of curvic slot 710 into reduced diameter bore portion 740, as landing gear wheel(s) 320 move(s) out of longitudinally alignment with the fuselage (135). This disengages centering slider 530 from damper shaft 510 (i.e., damper shaft centering slider splines 550 from centering slider damper shaft splines 545) and allows landing gear wheel yoke 420, and thereby, mounted landing gear wheel(s) 320, to rotate about pivot shaft 430, disengaged from torsional damper 440, as the landing gear wheel(s) move(s) out of longitudinally alignment with the fuselage (135).

In operation, the present (auxiliary) landing gear 400 with 360-degree caster and variable shimmy damping 410 provides aircraft landing gear castering and shimmy damping by engaging aircraft landing gear shimmy damper 440, through engaging centering cam 505 of damper shaft 510 in (machined) curvic slot 710 in internal diameter 525 of a landing gear wheel spindle, such as hollow pivot shaft 430, when landing gear wheel 320 is aligned with forward ground travel of the aircraft. However, when the aircraft begins to turn, centering cam 505 is pushed out of curvic slot 710, disengaging aircraft landing gear shimmy damper 440. Then, when the aircraft returns to a straight-line travel, centering cam 505 slides back into curvic slot 710, reengaging aircraft landing gear shimmy dampener 440. Hence, in embodiments of the present devices, systems and methods, the internal yoke mechanisms described above may be grease lubricated to ensure smooth, reliable operation.

In accordance with embodiments of the present devices, systems and methods, and the forgoing, aircraft landing gear shimmy damping may be varied by exchanging aircraft landing gear shimmy damper 440. For example, the damper mount 450 is detached from damper 440 and/or landing gear tailing arm 340. Aircraft landing gear shimmy damper is disengaged from damper shaft 510 (torsional damper splines 555), such as by sliding shimmy damper 440 upward in the illustrated embodiment. A different aircraft landing gear shimmy damper is then engaged on damper shaft, such as by sliding it down onto damper shaft 510 (torsional damper splines 555). The new shimmy damper is then torsionally anchored to landing gear tailing arm 340, such as by attaching damper mount 450 to damper 440 and landing gear tailing arm 340 in the illustrated embodiment.

Reference is made herein to "configuring" a device or a device "configured to" perform some operation(s), action(s), function(s), task(s), or the like. It should be understood that such configured devices are physically designed and/or adapted to perform the specified operation(s), action(s), function(s), task(s), or the like.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An aircraft landing gear shimmy damping device for aircraft landing gear with castering, the device comprising:
    a centering cam engaged in a curvic slot in an internal diameter of an aircraft landing gear wheel spindle when at least one landing gear wheel is aligned with forward ground travel of the aircraft, engaging a landing gear wheel shimmy dampener, the centering cam configured to:
        be pushed out of the curvic slot when the aircraft begins to turn, disengaging the landing gear wheel shimmy dampener; and
        slide back into the curvic slot and engage the shimmy dampener, when the landing gear wheel is realigned with forward ground travel of the aircraft.

2. The aircraft landing gear shimmy damping device of claim 1, wherein the centering cam is further configured to transfer turning torque through a damper shaft engaged with the shimmy dampener.

3. The aircraft landing gear shimmy damping device of claim 1, further comprising a damper shaft engaged with the shimmy dampener, and wherein the centering cam is further configured to transfer turning torque to the damper shaft.

4. The aircraft landing gear shimmy dampener device of claim 3 wherein aircraft landing gear shimmy damping is varied by exchanging the landing gear wheel shimmy dampener.

5. The aircraft landing gear shimmy dampener device of claim 4 wherein the landing gear wheel shimmy dampener is exchanged by disengaging the landing gear wheel shimmy dampener from the damper shaft and engaging a different landing gear wheel shimmy dampener with the damper shaft.

6. The aircraft landing gear shimmy dampener device of claim 1, wherein the centering cam is biased into, and back into, engagement in the curvic slot by an upper spring and/or a lower spring.

7. The aircraft landing gear shimmy damping device of claim 6, wherein the centering cam is further configured to be held against the internal diameter of the aircraft landing gear wheel spindle by the upper spring and/or the lower spring.

8. The aircraft landing gear shimmy dampener device of claim 1, wherein the aircraft landing gear wheel spindle comprises an aircraft landing gear yoke.

9. The aircraft landing gear shimmy dampener device of claim 1, wherein the aircraft landing gear wheel spindle is configured to rotationally mount the at least one landing gear wheel, the landing gear wheel spindle comprising a hollow pivot shaft configured to be rotationally mounted to a landing gear mounting arm, the hollow pivot shaft defining:
    a reduced diameter bore portion;
    a further reduced diameter bore portion within the reduced diameter bore; and
    the curvic slot defined in an inner surface of the further reduced diameter bore portion, extending across the further reduced diameter bore portion, open to the reduced diameter bore portion.

10. The aircraft landing gear shimmy dampener device of claim 9, further comprising:
    a damper shaft rotatably retained in the hollow pivot shaft, the damper shaft engaging a torsional damper torsionally anchored to the landing gear mounting arm;
    a centering slider retained longitudinally displaceable about the damper shaft in the hollow pivot shaft, the centering slider integrally comprising the centering cam, extending from the centering slider, the centering cam biased:
        into engagement into the curvic slot when the at least one landing gear wheel is generally aligned longitudinally with a fuselage for forward travel of the aircraft, engaging the torsional damper with the at least one landing gear wheel; and
        along the curvic slot and out of the curvic slot into the reduced diameter bore portion, disengaging the centering slider from the damper shaft and allowing the landing gear wheel spindle and mounted at least one landing gear wheel to rotate disengaged with the torsional damper, as the at least one landing gear wheel moves out of longitudinally alignment with the fuselage; and
        to slide back into the curvic slot, as the at least one landing gear wheel moves back generally aligned longitudinally with the fuselage for forward travel of the aircraft, reengaging the torsional damper with the at least one landing gear wheel.

11. The aircraft landing gear shimmy dampener device of claim 10, further comprising
    an upper spring disposed above the centering slider in spring engagement with the centering slider and the landing gear wheel spindle, and a lower spring disposed below the centering slider in spring engagement with the centering slider and the landing gear wheel spindle, the upper and lower springs providing the biasing of the centering cam by biasing:
        the centering slider into engagement of the centering cam into the curvic slot when the at least one landing gear wheel is generally aligned longitudinally with the fuselage for forward travel of the aircraft, engaging the torsional damper with the at least one landing gear wheel; and
        the centering slider along the curvic slot and the centering cam out of the curvic slot into the reduced diameter bore portion, disengaging the centering slider from the damper shaft and allowing the landing gear wheel spindle and mounted at least one landing gear wheel to rotate disengaged with the torsional damper, as the at least one landing gear wheel moves out of longitudinally alignment with the fuselage.

12. An aircraft comprising:
    a fuselage; and a landing gear comprising:
  a landing gear mounting arm extending from the fuselage;
    a landing gear wheel spindle configured to rotationally mount at least one landing gear wheel, the landing gear wheel spindle comprising a hollow pivot shaft configured to be rotationally mounted to the landing gear mounting arm, the hollow pivot shaft defining:
      a reduced diameter bore portion;
        a further reduced diameter bore portion within the reduced diameter bore; and
        a curvic slot defined in an inner surface of the further reduced diameter bore portion, extending across the further reduced diameter bore portion, open to the reduced diameter bore portion;
    a damper shaft rotatably retained in the hollow pivot shaft, the damper shaft engaging a torsional damper torsionally anchored to the landing gear mounting arm;
      a centering slider retained longitudinally displaceable about the damper shaft in the hollow pivot shaft, the centering slider comprising an integral centering cam extending from the centering slider; and
  an upper spring disposed above the centering slider in spring engagement with the centering slider and the landing gear wheel spindle, and a lower spring disposed below the centering slider in spring engagement with the centering slider and the landing gear wheel spindle, the upper and lower springs biasing:
    the centering slider into engagement of the centering cam into the curvic slot when the at least one landing gear wheel is generally aligned longitudinally with the fuselage for forward travel of the aircraft, engaging the torsional damper with the at least one landing gear wheel; and
      the centering slider along the curvic slot and the centering cam out of the curvic slot into the reduced diameter bore portion, disengaging the centering slider from the damper shaft and allowing the landing gear wheel spindle and mounted at least one landing gear wheel to rotate disengaged with the torsional damper, as the at least one landing gear wheel moves out of longitudinally alignment with the fuselage.

13. The aircraft of claim 12, wherein the landing gear mounting arm comprises a landing gear tailing arm.

14. The aircraft of claim 12, wherein the landing gear wheel spindle comprises a landing gear yoke.

15. The aircraft of claim 12, wherein the upper spring and lower spring are disposed in the hollow pivot shaft in engagement with the landing gear wheel spindle, with the centering slider disposed in spring bias between the upper spring and the lower spring.

16. The aircraft of claim 12, wherein torsional damping is varied by exchanging the aircraft landing gear shimmy damper.

17. The aircraft of claim 16, wherein exchanging the torsional damper further comprises disengaging the torsional damper from the damper shaft and engaging a different torsional damper with the damper shaft.

18. A method for providing aircraft landing gear castering and shimmy damping, comprising:
  engaging an aircraft landing gear shimmy damper by engaging a centering cam of a damper shaft in a curvic slot in an internal diameter of a landing gear wheel spindle when a landing gear wheel is aligned with forward ground travel of the aircraft;
  pushing the centering cam out of the curvic slot when the aircraft begins to turn, disengaging the aircraft landing gear shimmy damper; and
  sliding the centering cam back into the curvic slot, when the aircraft returns to a straight-line travel, reengaging the aircraft landing gear shimmy damper.

19. The method of claim 18, further comprising varying providing aircraft landing gear shimmy damping by exchanging the aircraft landing gear shimmy damper.

20. The method of claim 19, wherein varying providing aircraft landing gear shimmy damping by exchanging the aircraft landing gear shimmy damper further comprises disengaging the aircraft landing gear shimmy damper from the damper shaft and engaging a different aircraft landing gear shimmy damper with the damper shaft.

* * * * *